Patented Oct. 13, 1942

UNITED STATES PATENT OFFICE 2,298,881

ANTIOXIDANT

Carlin F. Gibbs, Silver Lake, Ohio, assignor to The B. F. Goodrich Company, New York, N. Y., a corporation of New York No Drawing. Application February 6, 1941, Serial No. 377,692

14 Claims. (Cl. 260—810)

This invention relates particularly to the art of rubber manufacture and especially to the preservation of rubber, synthetic rubber and rubber and synthetic rubber goods against deterioration, but includes also the preservation of other organic materials which tend to deteriorate by absorption of oxygen from the air such as fatty oils, cracked gasoline and other petroleum products, essential oils, synthetic plastics, and the like.

It is well known that many organic substances undergo a more or less rapid deterioration which is commonly ascribed to the action of atmospheric oxygen. It has heretofore been proposed to retard or inhibit this deterioration by adding a small proportion of a phenol, an aromatic base, or some other like substance, termed generally an "antioxidant."

I have discovered a new class of antioxidants which are very effective in retarding the deterioration of rubber and like organic materials. The antioxidants of this invention are sulfones having the structural formula

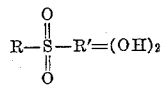

wherein R represents an organic radical with the free valence on a carbon atom, R' represents a radical with the free valence on a benzenoid ring, said radical containing an aromatic nucleus of the class consisting of nuclei of the benzene, naphthalene, and biphenyl series, and the two hydroxy groups are para to each other on a benzenoid ring.

R may be any hydrocarbon alkyl, alkenyl, aralkyl, cycloalkyl, aryl, or alkaryl group such as a methyl, allyl, benzyl, cyclohexyl, phenyl, or tolyl group, and may also contain substantially neutral or basic substituents such as hydroxy, alkoxy, aryloxy, amino, alkylamino, arylamino, halogen, or nitro groups. R' may be 2,5-dihydroxyphenyl, 6-methyl-2,5-dihydroxyphenyl, 4-methyl-2,5-dihydroxyphenyl, 3-methyl-2,5-dihydroxyphenyl, 4 - isopropyl-2,5-dihydroxyphenyl, (1,4-dihydroxy) beta-naphthyl, 3-(2,5-dihydroxy)xenyl, and similar groups containing hydrocarbon or other non-acid substituents. Typical compounds of this new class of antioxidants are as follows:

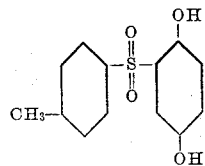

2,5-dihydroxyphenyl-p-tolylsulfone.

2,5-dihydroxyphenyl - o - tolylsulfone, 2,5-dihydroxyphenyl-m-tolylsulfone, 2,5 - dihydroxydiphenylsulfone, 2,5-dihydroxyphenyl-p-cymylsulfone, 2,5 - dihydroxyphenyl-alpha-naphthylsulfone, 2,5-dihydroxyphenyl-beta-naphthylsulfone, 2,5 - dihydroxyphenyl-beta-ac-tetrahydronaphthylsulfone, 2,5-dihydroxyphenyl - p - hydroxyphenylsulfone, 2,5-dihydroxyphenyl - p - aminophenylsulfone, 2,5 - dihydroxyphenyl-p-anilinophenylsulfone, 2,5-dihydroxyphenyl-p-phenoxyphenylsulfone, 2,5-dihydroxyphenylbenzylsulfone, 2,5 - dihydroxyphenylisopropylsulfone, 2,5-dihydroxyphenyl-n-butylsulfone, 3-(2,5 - dihydroxy)xenyl-p-tolylsulfone, 2-(1,4-dihydroxy) naphthyl-p-tolylsulfone, 2-(5,8 - dihydroxy) naphthyl-p-tolylsulfone, 2,5-dihydroxy-3'-chlorodiphenylsulfone, 2,5 - dihydroxy-4'-chlorodiphenylsulfone, 2,5-dihydroxy-3',6'-dichlorodiphenylsulfone, 2,5-dihydroxy-3-methyldiphenylsulfone, 2,5 - dihydroxy-3-benzyldiphenylsulfone, etc.

The majority of these compounds may be prepared by the action of a sulfinic acid upon a quinone according to the method described by Ullman and Pasdermadjian, Ber. 34, 1150 (1901). When compounds such as 2,5-dihydroxyphenyltolyl sulfone are prepared, it is convenient to employ a mixture of isomeric toluene sulfinic acids as a reactant and to employ the reaction product as the antioxidant without separation of the isomers.

To show the effectiveness of the antioxidants of this invention, 1 part by weight of various typical materials per 100 parts of rubber were incorporated in a rubber composition which melted when kept in a Bierer-Davis bomb for 96 hrs. at 70° C. under an oxygen pressure of 300 lbs./in.² after having been vulcanized in the absence of antioxidants. The per cent loss in tensile strength of vulcanizates containing the antioxidants of this invention is shown in the following table:

| Antioxidant | Cure | Percent loss in tensile strength |
| --- | --- | --- |
| 2,5-dihydroxyphenyl-xylylsulfone | 45' at 280° F | 12 |
| 2,5-dihydroxyphenyl-xylylsulfone | 60' at 280° F | 17 |
| 2,5-dihydroxyphenyl-tolylsulfone | 45' at 280° F | 16 |
| 2,5-dihydroxyphenyl-tolylsulfone | 60' at 280° F | 18 |
| 2,5-dihydroxyphenyl-chlorophenyl-sulfone | 45' at 280° F | 16 |
| 2,5-dihydroxyphenyl-chlorophenyl-sulfone | 60' at 280° F | 17 |
| 2,5-dihydroxyphenyl-n-butylsulfone | 45' at 280° F | 8 |
| 2,5-dihydroxyphenyl-n-butylsulfone | 60' at 280° F | 5 |

Not only did the use of the antioxidants of this invention change the vulcanizate from one which melted in the bomb to one which deteriorated only slightly, but it was found that the antioxidants did not appreciably stain white or light-colored compositions in which they were incorporated either in sunlight or in ordinary diffuse day light. The combination of high antioxidant power and the property of not staining rubber possessed by the class of materials herein claimed renders these antioxidants exceedingly useful in the rubber industry.

2,5-dihydroxyphenyl-chlorophenylsulfone and 2,5-dihydroxyphenyltolylsulfone were incorporated in synthetic rubber prepared by copolymerizing in aqueous emulsion 55 parts of butadiene and 45 parts of acrylonitrile. Although synthetic rubber vulcanizates became brittle when aged in the absence of an antioxidant, there was practically no loss in tensile strength or elongation when 3% of one of the above sulfones was present.

Although the antioxidants of this invention are particularly useful in white or light-colored rubber because of their ability to retard deterioration without danger of discoloration, they may obviously be used to retard the deterioration of dark-colored rubber compositions, or of compositions consisting of or containing unvulcanized rubber, gutta percha, balata, synthetic rubber such as neoprene or copolymers made from a conjugated diene such as butadiene and unsaturated hydrocarbons, nitriles, esters, ketones, or ethers such as styrene, acrylonitrile, methyl vinyl ketone, methyl vinyl ether, etc., rubber isomers and the like, all of which are chemically unsaturated and require the presence of an anti-oxidant to and require the presence of an antioxidant to be understood that the term "a rubber" is employed in the claims in a generic sense to designate these equivalent materials.

The proportion of antioxidant may vary from about 0.1% to 5%, although either smaller or greater proportions may be found useful, and it may be added to the rubber or other substance at any desired stage of the preparation of the product. If the material to which it is added is a liquid such as a rubber cement, latex, cracked gasoline, or an oil, the antioxidant may simply be dissolved or suspended therein. It is accordingly to be understood that the term "treating" is employed in the appended claims in a generic sense to embrace the incorporation of the antioxidant into a solid substance by milling or mastication, its addition to an aqueous dispersion such as rubber latex in a finely dispersed form, its solution in liquids, and any equivalent methods such as applying it to the surface of vulcanized or unvulcanized rubber in the form of a powder, paste, or solution.

While I have herein disclosed certain specific embodiments of my invention, I do not intend to limit myself solely thereto, for many modifications including substituting materials having equivalent chemical properties and varying the proportions of materials used are within the spirit and scope of the invention as defined in the appended claims.

I claim:

1. The method of retarding the deterioration of an organic substance which tends to deteriorate by adsorption of oxygen from the air which comprises treating the said substance with a compound having the structural formula

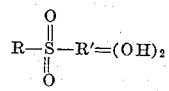

wherein R represents an organic radical with the free valence on a carbon atom, R' represents a radical with the free valence on a benzenoid ring, said radical containing an aromatic nucleus of the class consisting of nuclei of the benzene, naphthalene, and biphenyl series, and the two hydroxy groups are in para positions on a benzenoid ring.

2. The method of preserving rubber which comprises treating a rubber with a compound having the structural formula

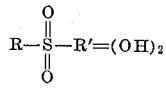

wherein R represents an organic radical with the free valence on a carbon atom, R' represents a radical with the free valence on a benzenoid ring, said radical containing an aromatic nucleus of the class consisting of nuclei of the benzene, naphthalene, and biphenyl series, and the two hydroxy groups are in the para position on a benzenoid ring.

3. The method of preserving rubber which comprises treating a rubber with a compound having the structural formula

wherein R represents an aryl group and R' represents a 2,5-dihydroxyphenyl group.

4. The method of preserving rubber which comprises treating a rubber with 2,5-dihydroxyphenyl-chlorophenylsulfone.

5. The method of preserving rubber which comprises treating a rubber with 2,5-dihydroxyphenyl-tolylsulfone.

6. The method of preserving rubber which comprises treating a rubber with a compound having the structural formula

wherein R represents an alkyl group and R' represents a 2,5-dihydroxyphenyl group.

7. The method of preserving rubber which comprises treating a rubber with 2,5-dihydroxyphenyl-n-butylsulfone.

8. A composition comprising an organic substance which tends to deteriorate by absorption of oxygen from the air and a compound having the structural formula

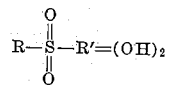

wherein R represents an organic radical with the free valence on a carbon atom, R' represents a radical with the free valence on a benzenoid ring, said radical containing an aromatic nucleus of the class consisting of nuclei of the benzene, naphthalene, and biphenyl series, and the two hydroxy groups are in the para position on a benzenoid ring.

9. A rubber composition comprising a rubber and a compound having the structural formula

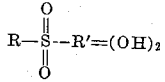

wherein R represents an organic radical with the free valence on a carbon atom, R' represents a radical with the free valence on a benzenoid ring, said radical containing an aromatic nucleus of the class consisting of nuclei of the benzene, naphthalene, and biphenyl series, and the two hydroxy groups are in para positions on a benzenoid ring.

10. A rubber composition comprising a rubber and a compound having the structural formula

wherein R represents an aryl group and R' represents a 2,5-dihydroxyphenyl group.

11. A rubber composition comprising rubber and 2,5-dihydroxyphenyl-tolylsulfone.

12. A rubber composition comprising rubber and 2,5-dihydroxyphenyl-chlorophenylsulfone.

13. A rubber composition comprising rubber and a compound having the structural formula

wherein R represents an alkyl group and R' represents a 2,5-dihydroxyphenyl group.

14. A rubber composition comprising rubber and 2,5-dihydroxyphenyl-n-butylsulfone.

CARLIN F. GIBBS.

CERTIFICATE OF CORRECTION.

Patent No. 2,298,881. October 13, 1942.
CARLIN F. GIBBS.

It is hereby certified that error appears in the printed specification of the above numbered patent requiring correction as follows: Page 1, first column, line 59, for "tolysulfone" read --tolylsulfone--; page 2, first column, line 29, for "and require the presence of an antioxidant to" read --prevent rapid deterioration. It is accordingly to--; line 63, claim 1, for "adsorption" read --absorption--; and that the said Letters Patent should be read with this correction therein that the same may conform to the record of the case in the Patent Office.

Signed and sealed this 8th day of December, A. D. 1942.

(Seal)

Henry Van Arsdale,
Acting Commissioner of Patents.